United States Patent [19]

Evtuhov

[11] 4,321,550
[45] Mar. 23, 1982

[54] PHASE CONJUGATE CORRECTION FOR HIGH GAIN AMPLIFIER SYSTEMS

[75] Inventor: Viktor Evtuhov, Pacific Palisades, Calif.

[73] Assignee: Hughes Aircraft Company, Culver City, Calif.

[21] Appl. No.: 86,872

[22] Filed: Oct. 22, 1979

[51] Int. Cl.³ .......................... H01S 3/23; H01S 3/30
[52] U.S. Cl. .................................. 330/4.3; 307/425; 372/9
[58] Field of Search ................. 330/4.3; 331/94.5; 307/425

[56] References Cited

U.S. PATENT DOCUMENTS

| | | | |
|---|---|---|---|
| 3,469,107 | 9/1969 | Townes et al. | 307/425 |
| 3,731,103 | 5/1973 | O'Meara | 343/100 TD |
| 3,967,899 | 7/1976 | O'Meara | 356/5 |
| 4,005,935 | 2/1977 | Wang | 330/4.3 |
| 4,102,572 | 7/1978 | O'Meara | 332/7.51 |
| 4,145,671 | 3/1979 | Hellworth | 332/7.51 |
| 4,148,031 | 4/1979 | Tausworth et al. | 343/100 TD |

OTHER PUBLICATIONS

Wang et al., "Correction of Phase . . . Brillouin Scattering", 1/78, Optics Letters, vol. 2, #1, pp. 4-6.
Bloom et al., "Observation of Amplified . . . Vapor", 3/78, pp. 58-60, Optics Letters, vol. 2, #3.
Stark, "Lasers and Power Systems . . . Reactors", 5/11/78, Americ. Nucl. Soci., 3rd Top. Meeting, NTIS OR78-1350, p. 10.
Heer et al, "Wave Front with Photon Echos", 10/77, pp. 49-50, Optics Communicators", vol. 23, #1.

Primary Examiner—Nelson Moskowitz
Attorney, Agent, or Firm—Kenneth W. Float; William H. MacAllister

[57] ABSTRACT

A laser provides light of a first frequency $\omega + \Delta$ along a first optical path, the light being focused by optics onto a target disposed at the primary focal plane of the optics. A laser amplifier is disposed along a second optical path which receives light reflected from the target and processed through a portion of the optics. This amplifier transmits, substantially unamplified, light at the first frequency $\omega + \Delta$ and amplifies light substantially at a second frequency $\omega$. Phase conjugation apparatus is disposed along the second optical path and provides light which is the phase conjugate of light incident thereupon. The phase conjugated light is provided at the second frequency $\omega$ and directed back through the laser amplifier for amplification thereof and through the optics to the target. The phase conjugated light self-corrects for optical distortions introduced into the light caused by the optics and laser amplifier, resulting in a nearly diffraction-limited high-power light beam impinging upon the target. Four specific embodiments are provided which employ stimulated Brillouin scattering, three-wave mixing, four-wave mixing and photon echo processes, respectively, in the phase conjugation apparatus.

8 Claims, 5 Drawing Figures

— 4,321,550 —

PHASE CONJUGATE CORRECTION FOR HIGH GAIN AMPLIFIER SYSTEMS

The present invention relates generally to laser systems and more particularly to apparatus that corrects for optical wavefront distortions in high power laser systems.

BACKGROUND OF THE INVENTION

Power generation by inertial confinement fusion using high power, short pulse lasers has led to the development of very large high gain laser amplifiers. These amplifiers generate high power laser beams which are focused onto a small nuclear fuel pellet to produce fuel compression and burn. The gain medium and the complex optics associated with these amplifiers introduce wavefront distortions into the high power laser beam resulting in reduction of energy densities on the pellet and uncertainties in the aim of the beam.

One method for providing a corrected beam which might be adapted for use with high power laser amplifiers is that described in U.S. Pat. No. 3,731,103 for "Adaptive Arrays" or U.S. Pat. No. 3,967,899 for "Method and Apparatus for Maintaining Far Field Spatial Coherency in Electromagnetic Transmitting Systems," both by T. R. O'Meara. These systems incorporate adaptive ptics which utilize coherent optical adaptive techniques to accomplish the wavefront correction. In particular, the systems use a mechanically deformed mirror and a multichannel electro-mechanical serve system to accomplish the desired wavefront correction. Generally, however, these systems are very complex and response times are on the order of one millisecond or longer. Such long response times are generally not useful in inertial confinement fusion systems.

A second method of providing for wavefront corrections is described in U.S. Pat. No. 4,005, 935 for "Method and Apparatus for Providing a Phase Compensated Optical Beam," by V. Wang. This patent describes a nonlinear phase conjugation system which eliminates the need for complex servo systems, and in addition is essentially instantaneous in its response time. However, use of this system, as well as the adaptive optical systems described above requires that a high power laser beam traverse the system components three times in order that a finally corrected beam be obtained.

For the purposes of inertial confinement fusion, however, only a single high power laser beam pulse is allowed to strike the target. This limitation is imposed in order to avoid gain depletion in the laser amplifier and damage to optical components.

Thus, presently existing techniques are inappropriate for use with high power laser amplification systems.

SUMMARY OF THE INVENTION

Accordingly it is an object of the present invention to provide phase conjugate correction of wavefront distortions in high power laser amplifiers which does not deplete the gain medium or cause excessive damage to optical components.

It is a further object of the present invention to provide a phase conjugate correction system which is particularly adaptable for use with an inertial confinement fusion system.

In accordance with these and other objects of the present invention, there is provided apparatus including laser oscillator means, disposed along a first optical path which provides coherent light at a first frequency $\omega + \Delta$. Generally, the oscillator means includes a laser operating at a second frequency $\omega$ and an optical frequency shifter which shifts the light frequency to $\omega + \Delta$. Optics is provided along the first optical path for focusing the frequency shifted laser light provided by the oscillator means. A target, such as an inertial confinement fusion pellet, is located at a primary focal plane of the optics.

A laser amplifier is disposed along a second optical path for receiving light reflected from the target and processed through a portion of the optics. The laser amplifier transmits, substantially unamplified, light at the first frequency $\omega + \Delta$ and amplifies light substantially at the second frequency $\omega$. Phase conjugation means is disposed along the second optical path for converting light at the first frequency $\omega + \Delta$ to light at the second frequency $\omega$, and for providing light which is the phase conjugate of light incident thereupon. The phase conjugated light is provided at the second frequency $\omega$ and is directed substantially along the second optical path back through the laser amplifier for substantial amplification thereof, and through the portion of the optics to the target in the opposite direction. The phase conjugated light corrects for wavefront distortions introduced into the light by the optics and the laser amplifier, and provides for a phase-compensated, nearly diffraction limited beam incident upon the target.

The phase conjugation means may employ apparatus which implements the phase conjugation by four distinct processes: namely; stimulated Brillouin scattering, four-wave mixing, three-wave mixing, or photon echoes. Apparatus for implementing the phase conjugation by stimulated Brillouin scattering includes a second frequency shifter, a second amplifier and a nonlinear medium which is capable of undergoing stimulated Brillouin scattering. The three-wave mixing apparatus includes a nonlinear medium and a laser oscillator operating at a first predetermined frequency. The laser light interacts with the nonlinear medium and the light reflected from the target to provide the phase conjugated light. The four-wave mixing apparatus incorporates a frequency shifter, a nonlinear medium, and at least one laser operating at a second predetermined frequency. The laser light interacts with the nonlinear medium and frequency shifted light reflected from the target to produce the phase conjugate light. The photon echo apparatus essentially comprises a second frequency shifter, a second amplifier, an external laser oscillator operating at a third predetermined frequency, and a nonlinear medium, the nonlinear medium being substantially different than the nonlinear media of the other embodiments.

BRIEF DESCRIPTION OF THE DRAWINGS

The foregoing and other objects and features of the invention may be readily understood with reference to the following detailed description taken in conjunction with the accompanying drawings, in which like reference numerals designate like structural elements, and in which.

DETAILED DESCRIPTION OF THE INVENTION

Figure 1:
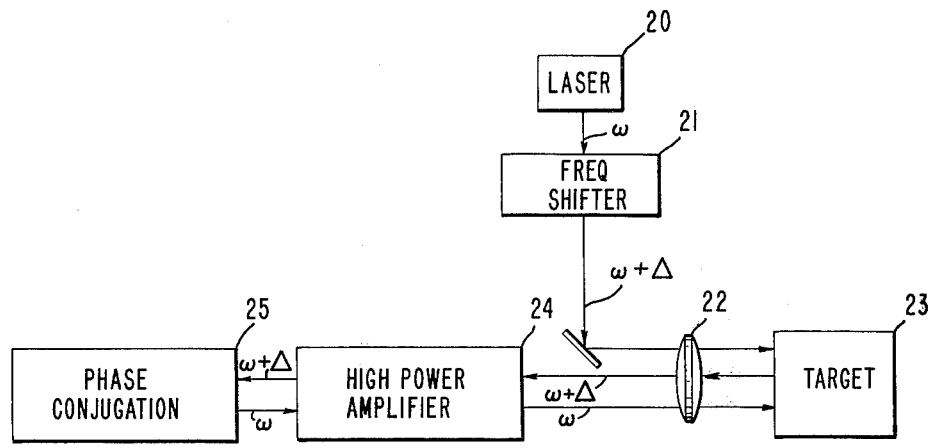
FIG. 1 shows a generalized block diagram of a high gain amplifier system made in accordance with the principles of the present invention.

Referring to FIG. 1, there is shown a generalized configuration of a high gain amplifier system made in accordance with the present invention. A laser 20, which may be a $CO_2$, or Nd:YAG laser, or the like, provides coherent light at a first frequency $\omega$ along a first optical path. An optical frequency shifter 21, such as a lithium niobate crystal, or the like, is disposed along the first optical path for shifting the coherent light to a second frequency $\omega + \Delta$. Other devices or processes which may be adapted for use as frequency shifters are described in "Stark Tuned 26 GHz Parametric Upconversion at 10.8 $\mu$m," by C. K. Asawa et al., *IEEE JQE*, QE-13, 47D, (1977); or "Stark-Induced Three-Wave Mixing in Molecular Gases—Part I: Theory" by R. L. Abrams et al, *IEEE JQE*, QE-13, No. 3, (1977), "Stark-Tuned Three-Wave Mixing in Molecular Gases—Part II: Experiment", by R. L. Abrams et al, *IEEE JQE*, QE-13, No. 3, (1977); and R. T. Denton, in *Laser Handbook*, p. 703, edited by F. T. Arecchi et al, North Holland Publishing Co., Amsterdam, 1972. An optical system, herein shown as optics 22, may generally include a plurality of optical devices, such as polarizers, optical rotators, focusing elements, and absorbers, or the like. The optics 22 is disposed along the first optical path for focusing light provided by the optical frequency shifter 21. A target 23, such as an inertial confinement fusion pellet, or the like, is diposed along the first optical path at a primary focal plane of the optics 22.

The present invention is described herein relative to a stationary target 23. However, the systems of the present invention are not limited to stationary targets, but may be used in conjunction with moving targets, such as a moving aircraft or a moving inertial confinement fusion pellet.

A laser amplifier 24 is disposed along a second optical path for receiving light reflected from the target 23 and processed through a portion of the optics 22. The laser amplifier 24 amplifies light substantially at a frequency $\omega$, and transmits, substantially unamplified, light at frequency $\omega + \Delta$. Phase conjugation means 25 is disposed along the second optical path providing light which is the phase conjugate of light incident thereupon. The phase conjugation means 25 provides light at frequency $\omega$ which is directed substantially along the second optical path back through the laser amplifier 24 in the opposite direction, for substantial amplification thereof, and through a portion of the optics 22 to the target 23. The phase conjugated light corrects for wavefront distortions introduced into the light incident thereupon caused by the optics 22 and the laser amplifier 24 and reflected from the target 23.

The first and second optical paths are shown as three separate and distinct light paths for the purpose of clarity in dealing with the various light frequencies. Clearly, the first and second optical paths may be coincidental, at least along a portion of the paths, and the two beams travelling along the second optical path are, in general, totally coincidental.

In operation the laser 20 provides coherent light at a frequency $\omega$ which is frequency shifted by the optical frequency shifter 21 to a frequency $\omega + \Delta$. The light at frequency $\omega + \Delta$ is made incident upon the target 23 by the optics 22. This light reflected from the pellet 23 and passes through the laser amplifier 24 without being amplified. The laser amplifier 24 generally amplifies light within a frequency band which is centered around $\omega$ and having a bandwidth substantially less than $2\Delta$.

Accordingly, the coherent light at frequency $\omega + \Delta$ is incident upon the phase conjugation means 25, wherein the light is frequency shifted to a frequency $\omega$, phase conjugated, and returned along the incident optical path. The light at frequency $\omega$ is then amplified by the laser amplifier 24 and directed onto the target 23 as a high power laser beam.

The reflected light from the target 23 (commonly referred to as a probe beam) at frequency $\omega + \Delta$ traverses the second optical path through optics 22 and the laser amplifier 24 to the phase conjugation means 25. In traversing this path, the light encounters aberrations and perturbations caused by both the optics 22 and the laser amplifier 24. These result in distortions in the light wavefronts which are present when the light impinges upon the phase conjugation means 25. The phase conjugation means 25 essentially reflects the phase conjugate waveform of the incident light at a frequency $\omega$. Once this phase conjugate waveform traverses the second optical path through the laser amplifier 24 and optics 22, the distortion present in the light waveforms is removed, and the laser light amplified, thus providing a high-power diffraction-limited beam incident upon the target 23.

Specific embodiments of the present invention are shown in FIGS. 2, 3, 4 and 5 employing the processes of: stimulated Brillouin scattering; three-wave mixing; four-wave mixing; and photon echoes. These processes are well-known in the art and are discussed extensively in the literature, and reference is hereby made to numerous articles cited hereinafter for a detailed description and explanation of the physics and the complex mathematics that describe these processes.

Figure 2:
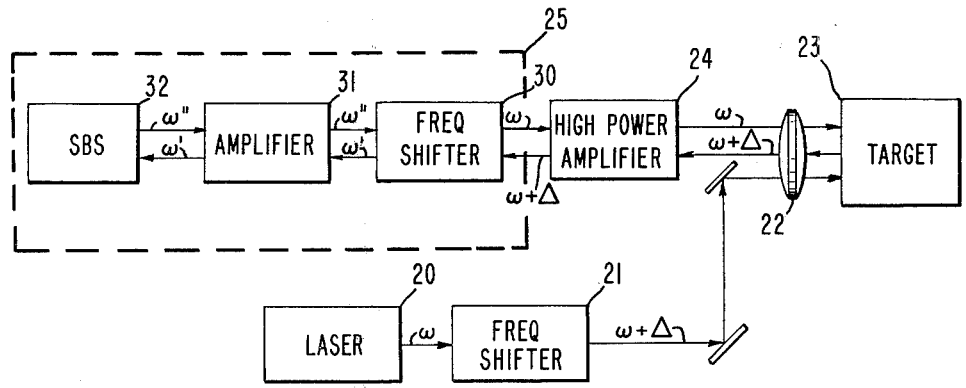
FIG. 2 shows a high gain amplifier system incorporating the principles of the present invention and specifically employing the stimulated Brillouin scattering process.

Referring now to FIG. 2 there is shown a high gain amplifier system employing the stimulated Brillouin scattering (SBS) process. The system of FIG. 2 is substantially the same as that shown in FIG. 1 and described hereinabove however the phase conjugation means 25 is fully described. In this embodiment, the phase conjugation means 25 further comprises an optical frequency shifter 30, a second amplifier 31 and a nonlinear medium 32 which is capable of generating phase conjugate light by the process of stimulated Brillouin scattering. Typical of nonlinear media for use in this process are carbon disulfide, methane, germanium, underdense helium, hydrogen or other plasma, or the like.

The properties of stimulated Brillouin scattering are generally well-known, and reference is made to the following patent and publications. These include, for reference, U.S. Pat. No. 4,005,935 for "Method and Apparatus for Providing a Phase Compensated Optical Beam," V. Wang; "Connection Between Wave Fronts of the Reflected and Excited Light in Stimulated Mandelshtam-Brillouin Scattering," Zeldovich et al, ZhETF Pis. Red. Vol. 15, No. 3, pp. 160–164, (1972); "Cancellation of Phase Distortion in the Amplifying Medium with a Brillouin Mirror," Nosach et al, ZhETF Pis. Red. Vol. 16, No. 11, pp. 617–621, (1972); and "Correction of Phase Aberrations via Stimulated Brillouin Scattering," V. Wang et al, *Optics Letters*, Vol. 2, No. 1, (1978).

This embodiment of the phase conjugation means 25 operates as follows. The optical frequency shifter 30 shifts the frequency of the low power reflected beam, generally referred to as a probe beam, from a frequency $\omega + \Delta$ to a frequency $\omega'$. The frequency $\omega'$ is chosen so that a beam of frequency $\omega$ is obtained at the output of the phase conjugation means 25 after all amplification, conjugation and frequency shifting processes have been performed. This beam is amplified by the second amplifier 31 to increase the energy of the probe beam to a level sufficient to produce stimulated Brillouin scattering in the nonlinear medium 32. The beam is conjugated by the nonlinear medium 32, and ultimately returned to frequency $\omega$, and then returned along the original optical path through the laser amplifier 24, wherein the beam is amplified to a high power level, and hence through the optics 22 to the target 23 as a diffraction-limited beam.

The function of the frequency shifter 30 is to shift the incoming frequency $\omega + \Delta$ in such a manner as to provide frequency $\omega$ at the output of the phase conjugation means 25.

The frequency shifting performed in this embodiment may vary from being an extremely simple operation to one very complex because of the interrelationships between the nonlinear medium 32, frequency shifter 30, the bandwidth of the high power amplifier 24 and the laser frequencies involved. The SBS nonlinear medium 32 is known in the art to introduce a doppler frequency shift into the light frequency caused by acoustic waves set up in the medium 32. The doppler frequency shift is typically on the order of 50-200 MHz, and is determined by the particular non-linear medium 32 used. In most instances, the doppler shift is relatively insignificant compared with the operational frequency $\omega$. Accordingly, all the frequency shifting would be accomplished in the frequency shifter 30. For example, a typical $CO_2$ laser amplifier operating at 10.6 micrometers has a bandwidth on the order of 4 GHz. A frequency shift $\Delta$ therefore must be greater than 2 GHz. A doppler frequency shift of 50-200 MHz, 0.05-0.2 GHz, does not substantially affect the overall system performance since the shifted frequency is within the amplifier bandwidth. If, on the other hand, the doppler shift introduced by a particular nonlinear medium is large, on the order of 2 GHz, then the frequency shifter 30 would not be required, since the desired frequency shift is provided by the nonlinear medium 32.

Frequency shifters are discussed in a text entitled "Quantum Electronics", 2nd ed., by A Yariv, John Wiley and Sons, New York, 1975. The frequency shifter 30 may be of the type which non-reciprocally shifts the light frequency, or in other words, operates on light travelling in only one direction. For this type of shifter, the frequency of the light provided by the nonlinear medium 32, designated herein as $\omega''$ is equal to $\omega$, the desired output frequency. Accordingly, the frequency shifter 30 would provide light at frequency $\omega'$ to the nonlinear medium 32, with $\omega'$ being chosen to compensate for the doppler shift in the nonlinear medium 32 so as to provide for frequency $\omega''$ to equal $\omega$.

The frequency shifter 30 may operate on light travelling in both directions, with the frequency shift provided thereby being either in equal or unequal amounts in both directions. If, for instance, the frequency shifts are equal and in the same direction, the frequency shifter 30 would provide a frequency $\omega' = \omega + \Delta/2 + $ doppler shift, so that the nonlinear medium 32 would provide a frequency $\omega'' = \omega + \Delta/2$, and hence upon passing through the frequency shifter 30 in the opposite direction, $\omega''$ becomes $\omega$ as the light exits the phase conjugation means 25. For other types of frequency shifters the phase conjugated beam provided by the nonlinear medium 32 should be diverted around the frequency shifter 30.

Thus, in summary, the energy from the target 32 forms a probe beam which traverses the optics 22 and the laser amplifier 24 and thus samples the optical distortion caused therein. Because the frequency of the probe beam is outside the bandwidth of the laser amplifier 24, no gain depletion occurs in the laser amplifier 24, and the power level of the probe beam stays low, precluding any possibility of damage to optical components. After the probe beam emerges from the high power laser amplifier 24, it is frequency shifted by the optical frequency shifter 30, amplified in the laser amplifier 31 to a level adequate to produce stimulated Brillouin scattering in the nonlinear medium 32, and is conjugated therein. The conjugated beam provided by the phase conjugation means 25, is at frequency $\omega$, and hence passes back through the high power laser amplifier 24 for amplification thereof and the optics 22, and impinges upon the target 23 as a phase-corrected high power beam.

Figure 3:
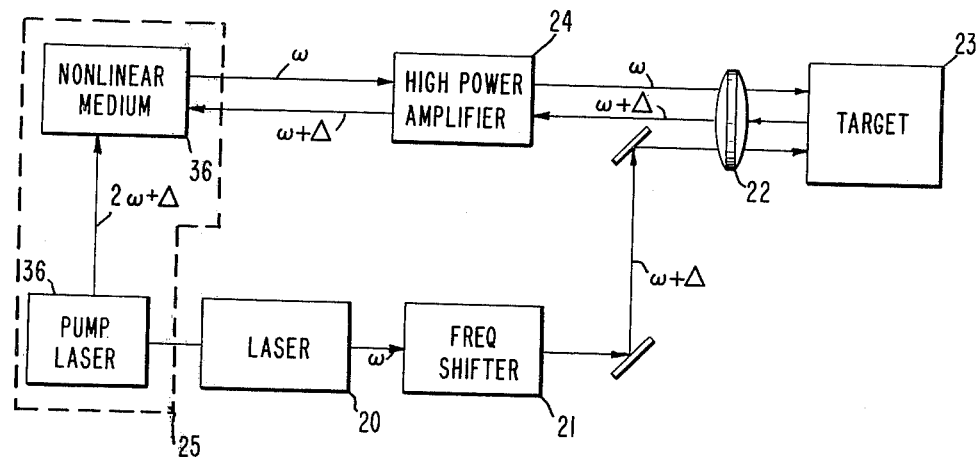
FIG. 3 shows a diagram of a high gain amplifier system employing the three-wave mixing process.

Referring to FIG. 3, there is shown an embodiment of the present invention employing the three-wave mixing conjugation process. Again, the embodiment of FIG. 3 is substantially the same as that of FIG. 1, but in this embodiment the phase conjugation means 25 comprises a nonlinear medium 36 and an external laser source 35, generally referred to as a pump laser. Typical of nonlinear media which may be employed in the three-wave mixing process are lithium niobate, lithium formate, KDP and barium titanate, or the like. The three-wave mixing process is described in publications by P. V. Avizonis et al, "Optical Phase Conjugation in a Lithium Formate Crystal," Appl. Phys. Lett. 31, No. 7, (1977), and A. Yariv, "On transmission and recovery of three-dimensional image information in optical waveguides", *JOSA*, Vol. 66, p. 301, (1976).

In operation, the external laser source 35 provides a beam having a first predetermined frequency $2\omega + \Delta$ which impinges upon the nonlinear medium 36. The lower power probe beam at frequency $\omega + \Delta$ is reflected from the target 23 through the optics 22 and laser amplifier 24, sampling the distortion caused therein, and then impinges upon the nonlinear medium 36. The interaction between the probe beam and the pump beam provided by the external laser source 35 results in a conjugate beam at frequency $\omega$ which is returned along the path of the probe beam but in the opposite direction. The conjugated beam is amplified by the laser amplifier 24 and subsequently focused onto the target 23 by the optics 22 as a nearly diffraction-limited beam.

Figure 4:
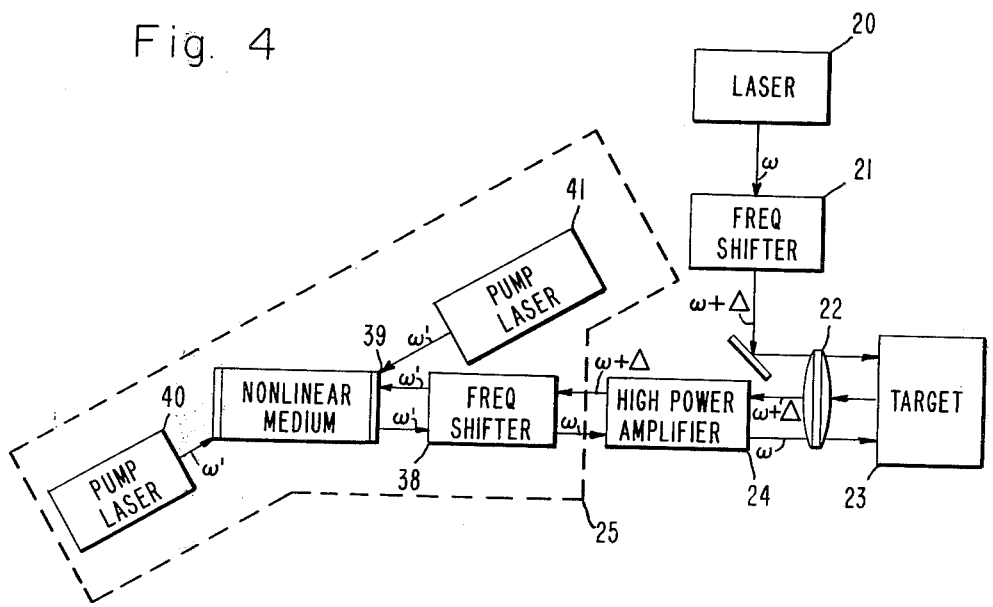
FIG. 4 shows a high gain amplifier system incorporating employing the four-wave mixing process.

Referring now to FIG. 4 there is shown an embodiment of the present invention employing four-wave mixing. phase conjugation. For a better understanding of four-wave mixing, see, "Recording Two-dimensional and Three-dimensional Dynamic Holograms in Transparent Substances," Stepanov et al, Soviet Physics-Doklady, Vol. 16, No. 1, (1970), "Amplified Reflection, Phase Conjugation and Oscillation in Degenerate Four-Wave Mixing," Yariv, Opt. Lett., Vol. 1, p. 16, (1973), and "Generation of Time Reversed Wave Fronts by Nonlinear Refraction," R. W. Hellwarth, *JOSA*, Vol. 67, No. 1, (1977).

Again, the embodiment of FIG. 4 is substantially identical to the embodiment of FIG. 1, but in this embodiment the phase conjugation means 25 includes an optical frequency shifter 38, which may be of the non-reciprocally shifting type described hereinabove, a nonlinear medium 39, such as $CS_2$ or ruby, or the like, and two lasers 40, 41. The lasers 40, 41, each operating at a second predetermined frequency, are disposed so that the beams emitted therefrom impinge upon the nonlinear medium 39 from substantially opposite directions.

In operation, the low power probe beam is reflected from the target 23 through the optics 22 and laser amplifier 24, thus sampling the distortion caused thereby. The probe beam is down-shifted to frequency $\omega'$ by the optical frequency shifter 38, and the probe beam then impinges on the nonlinear medium 39. The interaction between the probe beam and the laser beams provided by the two lasers 40, 41 allow for phase conjugation of the probe beam. The phase conjugated beam is returned back through the laser amplifier 24 where it is amplified to a high power level, the beam then passes through the optics 22 which focuses it onto the target 23.

It may be noted that two lasers are not necessarily required for the four-wave mixing process. One laser, for example laser 40, may be used by splitting off a beam with a beamsplitter, or the like, and applying the split-off beam to the nonlinear medium 39 from the same direction as that of the beam provided by the second laser (laser 41). However, use of two lasers 40, 41 provides for amplification and gain in the conjugated beam.

Figure 5:
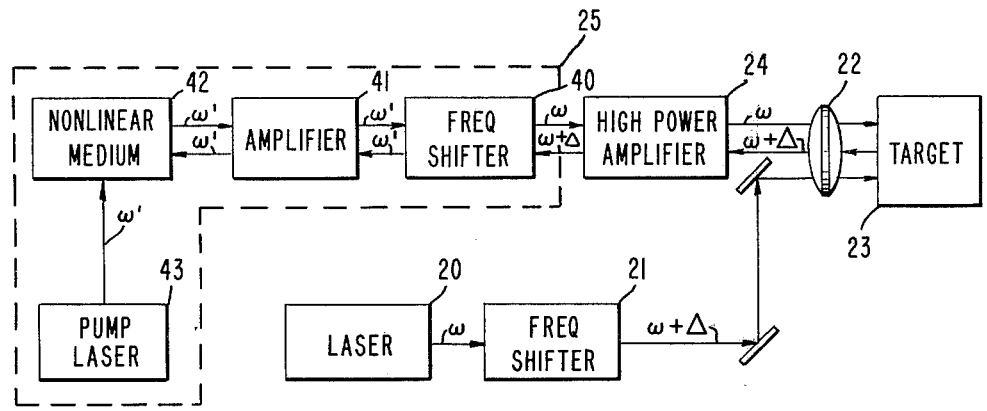
FIG. 5 shows a high gain amplifier system employing the photon echo process.

The photon echo embodiment of the phase conjugation means 25 shown in FIG. 5 comprises a frequency shifter 40, a second amplifier 41, and a nonlinear medium 42 disposed along the second optical path. A pump laser 43 provides a pump beam at a third predermined frequency $\omega'$ to the nonlinear medium 40. The operating frequency $\omega'$ is determined from the frequency shifter considerations described in connection with the FIG. 2 embodiment. The pump beam interacts with the probe beam in the nonlinear medium 42 and provides a phase conjugate beam of frequency $\omega'$ propagating along the second optical path toward the target 23. The frequency shifter 40 shifts the frequency $\omega'$ back to $\omega$ for amplification by the high power amplifier 24. Typical of nonlinear media which may be employed in this embodiment include $SF_6$, $SiF_4$, $BCl_3$, $CH_3F$ and $I_2$ vapor, or the like.

The photon echo embodiment which may be employed in the present invention, is known in the art and is described in a paper by C. V. Heer et al, "Wavefront Correction with Photon Echoes," Optical Communications, Vol. 23, No. 1, (1977), and in the text entitled *Quantum Electronics*, Sec. 15.3, cited hereinabove.

Thus, there has been described apparatus which provides phase conjugate correction in laser beams of high power laser amplifier systems caused by aberrations and the like introduced by the high power laser amplifier and associated optics.

It is to be understood that the above-described embodiments are merely illustrative of but a small number of the many possible specific embodiments which represent applications of the present invention. We do not wish to be limited to the particular phase conjugation processes described herein. Clearly, other phase conjugation processes may be devised which may be adapted for use with the present invention. In addition, numerous and various other arrangements may readily be devised in accordance with these principles by those skilled in the art without departing from the spirit and scope of the invention.

I claim:

1. Apparatus comprising:
   oscillator means, disposed along a first optical path for providing coherent light at a first frequency;
   optics disposed along said first optical path for focusing said coherent light provided by said oscillator means;
   a target disposed along said first optical path at a primary focal plane of said optics;
   a laser amplifier disposed along a second optical path for receiving light reflected from said target and processed through a portion of said optics, which transmits, substantially unamplified, light at said first frequency and which amplifies light substantially at a second frequency; and
   phase conjugation means disposed along said second optical path for responding to light at said first optical path reflected from said target, and for converting light at said first frequency to light at said second frequency, and for providing phase conjugate light at said second frequency which corrects for wavefront distortions introduced into said light at said first frequency caused by said optics and said laser amplifier, said phase conjugate light being directed substantially along said second optical path in the opposite direction back through said laser amplifier for substantial amplification thereof, and through said portion of said optics to said target.

2. The apparatus of claim 1 wherein said oscillator means comprises:
   a laser for providing light at said second frequency along the first optical path; and
   an optical frequency shifter disposed along said first optical path for providing light at said first frequency.

3. Apparatus comprising:
   oscillator means, disposed along a first optical path for providing coherent light at a frequency $\omega + \Delta$;
   optics disposed along said first optical path for focusing said coherent light provided by said oscillator means;
   a target disposed along said first optical path at a primary focal plane of said optics;
   a laser amplifier disposed along a second optical path for receiving light reflected from said target and processed through a portion of said optics, which transmits substantially unamplified, light at said frequency $\omega + \Delta$ and which amplifies light substantially at a frequency $\omega$; and
   phase conjugation means disposed along said second optical path for responding to light at said frequency $\omega + \Delta$ reflected from said target, and for converting light at said frequency $\omega + \Delta$ to light at said frequency $\omega$, and for providing phase conjugate light at said frequency $\omega$ which corrects for wavefront distortions introduced into said light at said frequency $\omega$ caused by said optics and said laser amplifier, said phase conjugate light and being directed substantially along said second optical path in the opposite direction back through said laser amplifier for substantial amplification thereof, and through said portion of said optics to said target.

4. The apparatus of claim 1 wherein said oscillator means comprises:
- a laser for providing light at frequency $\omega$ along the first optical path; and
- an optical frequency shifter disposed along said first optical path for providing light at frequency $\omega + \Delta$.

5. The apparatus of claim 1, 2, 3 or 4, wherein said phase conjugation means comprises stimulated Brillouin scattering apparatus which comprises:
- an optical frequency shifter disposed along said second optical path for shifting the frequency of said reflected light incident thereupon;
- a laser amplifier disposed in said second optical path for amplifying light provided by said optical frequency shifter; and
- a nonlinear medium disposed so as to receive said amplified reflected light and capable of undergoing stimulated Brillouin scattering so as to provide said phase conjugate light.

6. The apparatus of claim 1, 2, 3 or 4, wherein said phase conjugation means comprises three-wave mixing apparatus comprising:
- a nonlinear medium disposed along said second optical path; and
- a laser for providing light to said nonlinear medium at a first predetermined frequency which interacts with said reflected light and said nonlinear medium so as to provide said phase conjugate light.

7. The apparatus of claim 1, 2, 3 and 4, wherein said phase conjugation means comprises four-wave mixing apparatus which comprises:
- an optical frequency shifter disposed in said second optical path for shifting the frequency of light incident thereupon;
- a nonlinear medium disposed in said second optical path for receiving said frequency shifted light; and
- at least one laser for providing light at a second predetermined frequency which is incident upon said nonlinear medium from substantially opposite directions;
- whereby interaction between said reflected frequency shifted light, light from said one laser and said nonlinear medium provides said phase conjugate light.

8. The apparatus of claim 1, 2, 3, or 4 wherein said phase conjugation means comprises photon echo apparatus which comprises:
- an optical frequency shifter disposed along said second optical path for shifting the frequency of light incident thereupon;
- a laser amplifier disposed in said second optical path for amplifying light provided by said optical frequency shifter;
- a nonlinear medium disposed so as to receive light provided by said laser amplifier; and
- a laser for providing light at a third predetermined frequency incident upon said nonlinear medium;
- whereby interaction between said reflected light, light provided by said laser and said nonlinear medium provides said phase conjugate light.

* * * * *